United States Patent
Zhu et al.

(10) Patent No.: US 12,478,046 B2
(45) Date of Patent: Nov. 25, 2025

(54) ARTIFICIAL NEST FOR SOLITARY BEES AND APPLICATION METHOD THEREOF

(71) Applicants: ZHEJIANG UNIVERSITY, Hangzhou (CN); HAINAN INSTITUTE OF ZHEJIANG UNIVERSITY, Sanya (CN); HUZHOU PLANT PROTECTION QUARANTINE AND FERTILIZER MANAGEMENT STATION, Huzhou (CN)

(72) Inventors: Zengrong Zhu, Hangzhou (CN); Jin Lv, Hangzhou (CN); Xin Yuan, Hangzhou (CN); Wenwu Zhou, Hangzhou (CN); Ping Qian, Hangzhou (CN); Wendi Wu, Hangzhou (CN)

(73) Assignees: ZHEJIANG UNIVERSITY, Hangzhou (CN); HAINAN INSTITUTE OF ZHEJIANG UNIVERSITY, Sanya (CN); HUZHOU PLANT PROTECTION QUARANTINE AND FERTILIZER MANAGEMENT STATION, Hangzhou (CN)

(*) Notice: Subject to any disclaimer, the term of this patent is extended or adjusted under 35 U.S.C. 154(b) by 0 days.

(21) Appl. No.: 19/016,962

(22) Filed: Jan. 10, 2025

(65) Prior Publication Data

US 2025/0176505 A1  Jun. 5, 2025

Related U.S. Application Data

(62) Division of application No. 17/967,983, filed on Oct. 18, 2022, now Pat. No. 12,219,937.

(30) Foreign Application Priority Data

Oct. 19, 2021 (CN) .......................... 202111213997.5

(51) Int. Cl.
*A01K 47/06* (2006.01)

(52) U.S. Cl.
CPC .................................... *A01K 47/06* (2013.01)

(58) Field of Classification Search
CPC ........ A01K 47/06; A01K 47/02; A01K 47/04; A01K 67/033
See application file for complete search history.

(56) References Cited

U.S. PATENT DOCUMENTS

| | | | |
|---|---|---|---|
| 92,348 A | | 7/1869 | Paddock |
| 170,601 A | * | 11/1875 | Spurlin .................. A01K 47/06 449/22 |

(Continued)

OTHER PUBLICATIONS

Devon Johnson, "Entomologist's tips for installing and maintaining native bee 'houses'", Apr. 1, 2020, available at https://news.vt.edu/articles/2020/03/ext-entomologists-tips-for-installing-and-maintaining-native-bee-houses.html (2020).

*Primary Examiner* — William L Gmoser
(74) *Attorney, Agent, or Firm* — Miller, Canfield, Paddock and Stone, P.L.C.

(57) ABSTRACT

The present disclosure relates to the field of artificial honeycombs, in particular to an artificial nest for solitary bees and an application method of the artificial nest. The artificial nest comprises a main enclosure tube, hanging rings, a plurality of trapping hollow tubes and tightening mechanisms used for clamping the trapping hollow tubes. The hanging rings are arranged at an outer sidewall of the main enclosure tube. The tightening mechanisms are annularly arranged at an inner sidewall of the main enclosure tube, and the trapping hollow tubes are fixed in a ring of each tightening mechanism in an axis direction of the main enclosure tube. Each tightening mechanism comprises a connecting steel wire and fastening springs. The sidewall of (Continued)

the main enclosure tube is provided with fixing holes for fixing the tightening mechanisms.

9 Claims, 3 Drawing Sheets

(56) References Cited

U.S. PATENT DOCUMENTS

| | | | | |
|---|---|---|---|---|
| 481,578 A * | 8/1892 | Mason et al. | ......... | B29C 67/241 |
| | | | | 449/60 |
| 540,479 A * | 6/1895 | Aspinwall | ............... | A01K 47/04 |
| | | | | 449/44 |
| 2,239,708 A * | 4/1941 | France | .................... | B29C 43/50 |
| | | | | 449/12 |
| 4,141,098 A * | 2/1979 | Culhane | ................. | A01K 47/02 |
| | | | | 449/37 |
| 4,319,371 A * | 3/1982 | Wiederrich | ............ | A01K 47/00 |
| | | | | 449/4 |
| 4,365,372 A * | 12/1982 | Norman | ................. | A01K 67/30 |
| | | | | 449/4 |
| 4,491,994 A * | 1/1985 | Youssef | ................. | A01K 67/30 |
| | | | | 428/181 |
| 4,494,263 A * | 1/1985 | Brown | ................... | A01K 47/06 |
| | | | | 449/19 |
| 4,663,791 A * | 5/1987 | Nishi | ..................... | A01K 47/04 |
| | | | | 449/2 |
| 6,530,819 B1 * | 3/2003 | Rovera | ................. | A01K 47/04 |
| | | | | 449/44 |
| 11,160,258 B1 | 11/2021 | Chiles | | |
| 2022/0287282 A1 * | 9/2022 | Clark | ..................... | A01K 47/06 |

* cited by examiner

ARTIFICIAL NEST FOR SOLITARY BEES AND APPLICATION METHOD THEREOF

CROSS REFERENCE TO RELATED APPLICATION

This patent application is a divisional application and claims the benefit of priority under 35 U.S.C. §§ 120, 121 of U.S. patent application Ser. No. 17/967,983, filed on Oct. 18, 2022, which claims the benefit and priority under 35 U.S.C. § 119 of Chinese Patent Application No. 202111213997.5, filed on Oct. 19, 2021, the disclosures of which are incorporated by reference herein in their entirety as part of the present application.

TECHNICAL FIELD

The present disclosure relates to the field of artificial honeycombs, and in particular relates to an artificial nest for solitary bees and an application method of the artificial nest.

BACKGROUND ART

In nature, 85% of Hymenoptera bees are solitary, and their diversity is an important expression of the self-regulatory capacity of ecosystems. In the context of pesticide reduction in China, the use of solitary bees, which are prevalent in agroecosystems, to provide pollination and pest control services to farmland will become a new idea for green plant protection.

Solitary bees, Eumenes and Sphecidae that nest in hollow objects also construct their nests in artificial nests. The linear nest is usually divided into several cells by the nesting female bees using mud, leaves, grass stems and like. Eggs can be laid in each cell in which bee bread that matches the needs of the larvae for growth and development is stored. After the construction of each small cell is completed, the female bees will construct special structures at the nest entrance to avoid the invasion of natural enemies such as birds and the effects of environmental changes. Compared to sampling methods such as a yellow board sampling method, a sweep net sampling method, an overhead interceptor net sampling method, and a malaise trap sampling method, artificial nests have the advantages of long-term monitoring for biological observation or rearing, high targeting, large sample size, revealing trophic level relationships, and standardization and quantification, and thousands of solitary bee species can adapt to artificial nests. (O'Neill, 2001; Michener, 2007; Staab, et al. 2018).

The artificial nest, as an important means for researching solitary bees, can reflect habit characteristics of different species of bees. The artificial nest can be used as a tool for comparing community diversity in different habitats. As the diversity of the solitary bees can serve as a bioindicator (Gayubo, 2005), scholars have also used artificial nests to test hypotheses in relation to environmental change (Gathmann, 1994; Staab, et al. 2018). A large number of artificial nests with different diameters can be put into use to cover a large environmental range, which can trap a variety of solitary bees. Artificial nests can also be used to evaluate biodiversity (Krombein, 1967). As research progressed, researchers have recognized that artificial nests could be used to test hypotheses in relation to environmental change and species communities and were an important research tool in quantitative ecology. Sometimes it is necessary to conduct long-term follow-up studies on a species of solitary bee in a certain habitat. However, the conventional simple artificial nesting tubes has no difference in trapping various species of solitary bees in the same habitat. If only a specific solitary bee in that habitat is studied, the trapping efficiency of the conventional simple artificial nesting tubes is greatly reduced, and the disadvantage that the artificial nesting tubes are easy to fall off will have a greater impact on the trapping effect.

SUMMARY

An objective of the present disclosure is to solve the problem in the background art, and an artificial nest for solitary bees and an application method of the artificial nest are provided.

The technical objective of the present disclosure is achieved through the following technical solutions:

An artificial nest for solitary bees comprises a main enclosure tube, hanging rings, a plurality of trapping hollow tubes, and tightening mechanisms for clamping the trapping hollow tubes. The hanging rings are arranged at an outer sidewall of the main enclosure tube. The trapping hollow tubes are made of reed tubes, and the trapping hollow tubes are opened at both ends and each are provided with a tube node in the middle. Each trapping hollow tube has a length of 20 cm and an inner diameter of 5 mm to 12 mm. The main enclosure tube is made of a white PVC tube, and has a length of 20 cm and a diameter of 11 cm. Fifty to eighty trapping hollow tubes are arranged inside the main enclosure tube. The tightening mechanisms are annularly arranged at an inner sidewall of the main enclosure tube, and the trapping hollow tubes are fixed into a ring of the tightening mechanism in an axis direction of the main enclosure tube. Each tightening mechanism comprises a connecting wire and fastening springs, and the sidewall of the main enclosure tube is provided with fixing holes for fixing the tightening mechanisms.

Preferably, the trapping hollow tubes are all made of reed stalks. The dry reed stalks harvested in the current year are cut into segments, each segment of reed tube is ensured to have at most 1 node, flat and straight reed tubes with an inner diameter of 5 mm to 12 mm are selected, and then the reed tubes with various tube diameters are randomly mixed uniformly and tightly stuffed into the main enclosure tube.

Preferably, the main enclosure tube is provided with two sets of tightening mechanisms in an axis direction. The tightening mechanisms are 6.5 cm away from the edge of the main enclosure tube.

Preferably, the main enclosure tube is further provided with locking adjusting mechanisms. Each locking adjusting mechanism comprises an adjusting loop coil, a lifting adjusting block, and pulling steel wires. The connecting steel wire is provided with a fracture, the number of pulling steel wires is two, the tops of which are fixedly connected to both ends of the fracture of the connecting steel wire, respectively; the tail parts of the pulling steel wires are fixed to the lifting adjusting block. The pulling steel wires are provided by penetrating through the fixing hole, and the lifting adjusting block is threaded to the adjusting loop coil. The degree of tightness of the springs in the tightening mechanisms may be better adjusted by employing the structure above. It is guaranteed that a good fastening effect on the trapping hollow tube is achieved while the trapping hollow tube is not excessively squeezed.

An application method of an artificial nest for solitary bees, comprising the following steps:

S1: hanging, by a main enclosure tube, the artificial nest on a tall tree or a telephone pole by means of hanging rings on a main enclosure tube, and meanwhile, providing an initial tension to fastening springs in tightening mechanisms to make trapping hollow tubes be fastened and clamped into the tightening mechanisms, thereby preventing the trapping hollow tubes from falling off due to the influence of external factors;

S2: enabling an opening of the main enclosure tube to face east, south or southeast and to be 1 to 2 m away from the ground;

S3: checking the trapping hollow tubes, and sampling and dissecting so as to observe nesting situation of bee species in the trapping hollow tubes; and S4: according to the nesting condition of bee species in the trapping hollow tube, selecting new trapping hollow tubes with an appropriate size to replace the original trapping hollow tubes.

Preferably, when each trapping hollow tube is dissected, one end of the trapping hollow tube is pressed against a brim of a white porcelain plate, and a sealed end of a cell faces an experimenter; an area of about one third of the circumference of the tube is gently split with a knife along a direction of the tube; as the blade is sharp, in order to reduce the damage to the structure of the cell, only 5 cm is cut with the knife, and then the tube is gently broken off with hands along the section; after checking and recording the contents and structural states in the cell, if the bee bread in the cell is consumed completely, the bees are able to be moved to a centrifugal tube with air holes on a tube cover, which is convenient for observing the development; if there is still a large amount of bee bread in the cell, and the bees are still in the fragile larval stage, the split trapping hollow tube is covered and tied tightly with a rubber band, and then the trapping hollow tube is put in an artificial climate room for continuous culture.

Preferably, the trapping hollow tube special for trapping *Isodontia nigella* has a tube diameter of 9 mm to 10 mm; the trapping hollow tube special for trapping *Rhynchium quinquecinctum* has a tube diameter of 10 mm to 11 mm; and the trapping hollow tube special for trapping *Euodynerus nipanicus* and *Osmia excavata* Alfken has a tube diameter of 5 mm to 7 mm.

In conclusion, the present disclosure has the beneficial effects that:

1. In accordance with the artificial nest for the solitary bees, the tightening mechanisms are arranged in the main enclosure tube to make the artificial nest adapt to the change of reed tubes caused by the external environment, thereby preventing the defect that the trapping hollow tubes are prone to falling off in a conventional artificial nest trapping process.

2. In accordance with the artificial nest for solitary bees, the efficiency for trapping a certain species of solitary bees is improved by screening the reed tubes with a particular tube diameter.

Figure 1:
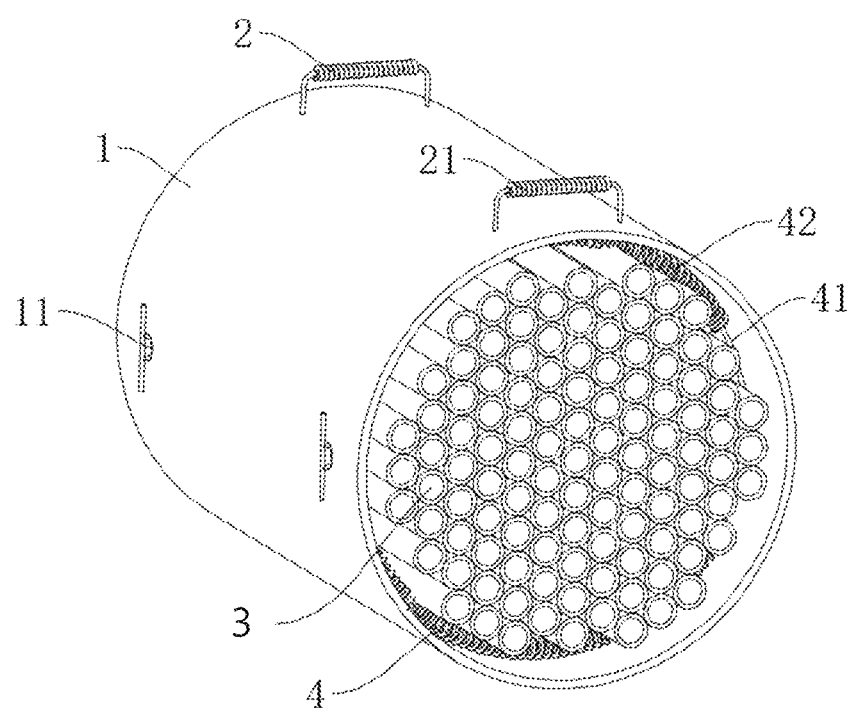
FIG. 1 is a structure diagram in accordance with the present disclosure.

In the drawings: 1—main enclosure tube, 11—fixing hole, 2—hanging ring, 3—trapping hollow tube, 4—tightening mechanism, 41—connecting steel wire, 411—fracture, 42—fastening spring, 5—locking adjusting mechanism, 51—adjusting loop coil, 52—lifting adjusting block, 53—pulling steel wire.

DETAILED DESCRIPTION OF THE EMBODIMENTS

The embodiments are only to be considered as explanation rather than limiting, those skilled in the art can make modification without creative contribution for the embodiments as required after reading the description, and the modification is protected by the patent law if the modification falls within the scope of claims of the present disclosure.

The present disclosure is described in detail below with reference to the accompanying drawings by way of embodiments.

Embodiment 1

As shown in FIG. 1, an artificial nest for solitary bees, comprising a main enclosure tube 1, hanging rings 2, a plurality of trapping hollow tubes 3, and tightening mechanisms 4 for clamping the trapping hollow tubes 3. The hanging rings 2 are arranged at an outer sidewall of the main enclosure tube 1. The tightening mechanisms 4 are annularly arranged at an inner sidewall of the main enclosure tube 1, and the trapping hollow tubes 3 are fixed into a ring of the tightening mechanism 4 in an axis direction of the main enclosure tube 1. Each tightening mechanism 4 comprises a connecting wire 41 and fastening springs 42, and the sidewall of the main enclosure tube 1 is provided with fixing holes 11 for fixing the tightening mechanisms 4.

The trapping hollow tubes 3 are made of reed tubes, and the trapping hollow tubes 3 are opened at both ends and each are provided with a tube node in the middle. Each trapping hollow tube 3 has a length of 20 cm and an inner diameter of 5 mm to 12 mm. The main enclosure tube 1 is made of a white PVC tube, and has a length of 20 cm and a diameter of 11 cm. Fifty to eighty trapping hollow tubes 3 are arranged inside the main enclosure tube 1. The tightening mechanism 4 is annularly arranged at an inner sidewall of the main enclosure tube 1, and the trapping hollow tubes 3 are fixed into a ring of the tightening mechanism 4 in an axis direction of the main enclosure tube 1. The tightening mechanism 4 comprises a connecting wire 41 and a fastening spring 42, and the sidewall of the main enclosure tube 1 is provided with a fixing hole 11 for fixing the tightening mechanism 4. The trapping hollow tubes 3 are all made of reed stalks. The dry reed stalks harvested in the current year are cut into segments, each segment of reed tube is ensured to have at most 1 node, flat and straight reed tubes with an inner diameter of 5 mm to 12 mm are selected, and then the reed tubes with various tube diameters are randomly mixed uniformly and tightly stuffed into the main enclosure tube 1.

The main enclosure tube 1 is provided with two sets of tightening mechanisms 4 in an axis direction. The hanging rings 2 are both provided with spring elastic segments 21, and the tightening mechanisms 4 are 6.5 cm away from the edge of the main enclosure tube 1.

During use, the artificial nest is hung to a high tree or a telegraph pole by means of the hanging rings 2, and meanwhile, an initial tension is provided to the fastening springs 42 in the tightening mechanisms 4, such that trapping hollow tubes 3 may be fastened and clamped into the tightening mechanisms 4 to prevent the trapping hollow tubes 3 from falling due to the influence of external factors.

Embodiment 2

Figure 2:
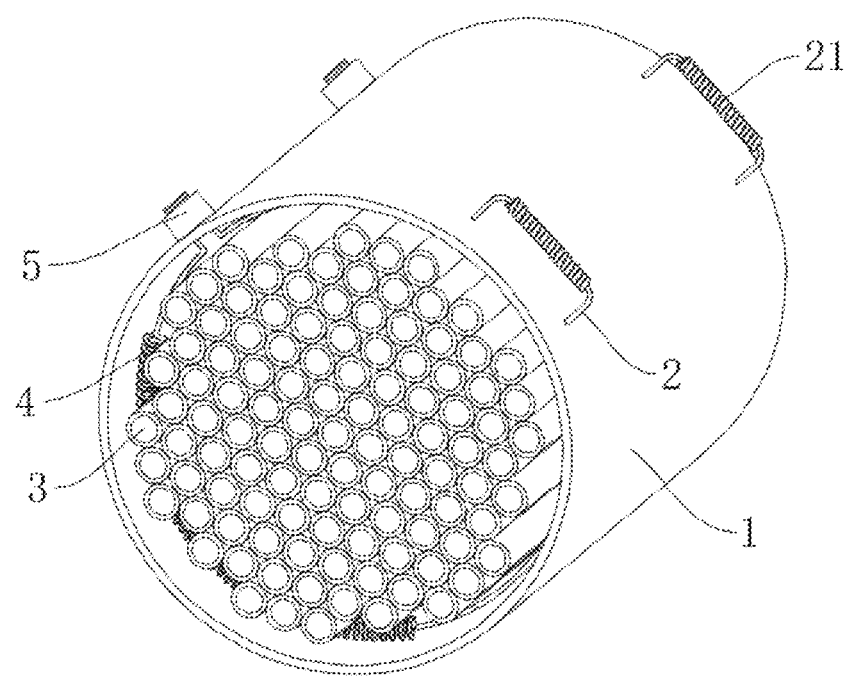
FIG. 2 is a structure diagram of an embodiment 2 in accordance with the present disclosure.
Figure 3:
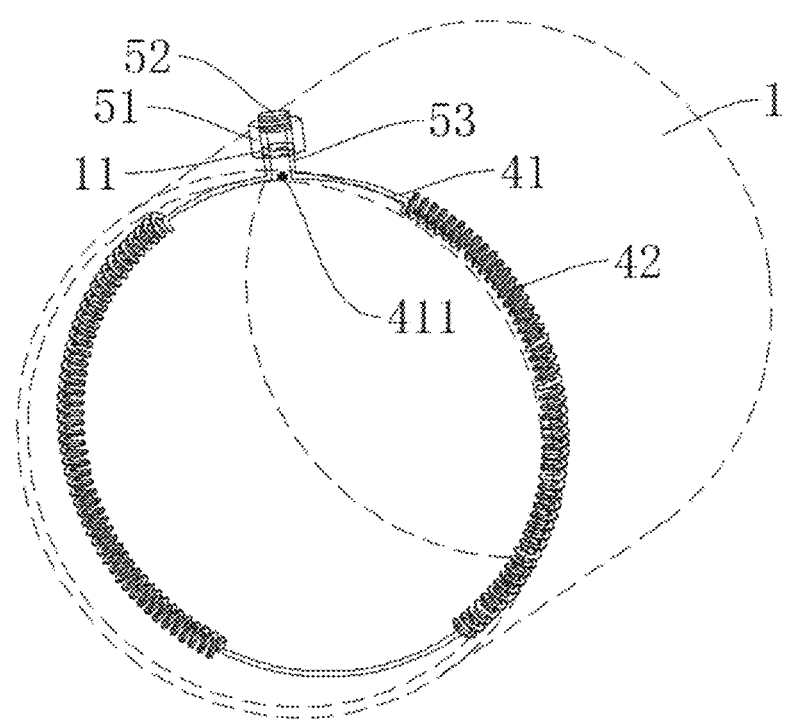
FIG. 3 is a structure diagram of a locking adjusting mechanism of an embodiment 2 in accordance with the present disclosure.

The difference from the embodiment 1 is that, as shown in FIG. 2 and FIG. 3, the main enclosure tube 1 is further provided with locking adjusting mechanisms 5. Each locking adjusting mechanism 5 comprises an adjusting loop coil 51, a lifting adjusting block 52, and pulling steel wires 53. The connecting steel wire 41 is provided with a fracture 411, the number of pulling steel wires 53 is two, the tops of which are fixedly connected to both ends of the fracture 411 of the connecting steel wire 41, respectively; and the tail parts of the pulling steel wires 53 are fixed to the lifting adjusting block 52. The pulling steel wires 53 are provided by penetrating through the fixing hole 11, and the lifting adjusting block 52 is threaded to the adjusting loop coil 51.

After the trapping hollow tubes 3 are placed into the tightening mechanisms 4, the fastening springs 42 are tightened or loosened under the action of the pulling steel wires 53 by rotating the adjusting loop coil, thereby guaranteeing that a good fastening effect on the trapping hollow tubes is achieved while the trapping hollow tubes are not excessively squeezed.

Embodiment 3

An application method of an artificial nest for solitary bees, comprising the following steps:

S1: the artificial nest is hung on a tall tree or a telephone pole through a main enclosure tube 1 by a main enclosure tube 1 by means of hanging rings 2, and meanwhile, an initial tension is provided to fastening springs 42 in tightening mechanisms 4, such that trapping hollow tubes 3 are able to be fastened and clamped into the tightening mechanisms 4 to prevent the trapping hollow tubes 3 from falling off due to the influence of external factors;

S2: the main enclosure tube 1 has an opening facing east, south or southeast, and the opening is 1 to 2 m away from the ground;

S3: the trapping hollow tubes 3 are checked monthly, and are sampled and dissected so as to observe nesting situation of bee species in the trapping hollow tubes 3; and S4: according to the nesting condition of bee species in the trapping hollow tube 3, new trapping hollow tubes 3 with an appropriate size are selected to replace the original trapping hollow tubes 3.

When each trapping hollow tube 3 is dissected, one end of the trapping hollow tube 3 is pressed against a brim of a white porcelain plate, and a sealed end of a cell faces an experimenter; an area of about one third of the circumference of the tube is gently split with a knife along a direction of the tube; as the blade is sharp, in order to reduce the damage to the structure of the cell, only 5 cm is cut with the knife, and then the tube is gently broken off with hands along the section; after checking and recording the contents and structural states in the cell, if the bee bread in the cell is consumed completely, the bees are able to be moved to a centrifugal tube with air holes on a tube cover, which is convenient for observing the development; if there is still a large amount of bee bread in the cell, and the bees are still in the fragile larval stage, the split trapping hollow tube 3 is covered and tied tightly with a rubber band, and then the trapping hollow tube is put in an artificial climate room for continuous culture.

Embodiment 4

An average tube diameter for trapping *Isodontia nigella* is 8.94 mm. By observing and measuring a large sample size, the diameter of an artificial nesting tube chosen by the *Isodontia nigella* for nesting ranges from 9 mm to 10 mm.

A determination standard for an effective nesting tube is as follows: for *Isodontia nigella*, larvae or pupae are visible inside the cell, If the larvae or pupae are invisible inside the cell, there must be a large number of residual preys in the cell and the grass clippings at the nest entrance are dense. When a reed tube has a node in the middle and there are bees of the same species nesting at both ends, the tube is recorded as two nesting tubes. If the tube is nested by different specifies of bees, it is also recorded as two nesting tubes.

Main parameter data of cell structure for *Isodontia nigella*

| Parameter | Sample unit | Sample size | Minimum value | Maximum value | Mean | Standard deviation |
|---|---|---|---|---|---|---|
| Tube diameter (mm) | Nesting tube | 109 | 5.98 | 11.86 | 8.94 | 1.12 |
| Cell length (mm) | Nesting tube | 150 | 11.89 | 105.36 | 43.79 | 18.08 |
| Adult length (mm) | Head | 34 | 16.08 | 19.58 | 16.30 | 1.56 |
| Adult width (mm) | Head | 34 | 3.47 | 4.45 | 3.93 | 0.32 |

Embodiment 5

An average tube diameter for trapping *Rhynchium quinquecinctum* is 9.47 mm. By observing and measuring a large sample size, the diameter of the artificial nesting tube chosen by the *Rhynchium quinquecinctum* for nesting ranges from 10 mm to 11 mm.

A determination standard for an effective nesting tube is as follows: for *Rhynchium quinquecinctum* constructing the nest by using mud, only nest data with intact nest entrance without holes can be included in the statistics. When a reed tube has a node in the middle and there are bees of the same species nesting at both ends, the tube is recorded as two nesting tubes. If the tube is nested by different species of bees, it is also recorded as two nesting tubes.

Main parameter data of cell structure for *Rhynchium quinquecinctum*

| Parameter | Sample size | Minimum value | Maximum value | Mean | Standard deviation |
|---|---|---|---|---|---|
| Tube diameter (mm) | 89 | 5.86 | 11.83 | 9.47 | 1.25 |
| Cell length (mm) | 168 | 10.23 | 72.42 | 32.06 | 10.83 |
| Adult length (mm) | 57 | 11.11 | 20.55 | 16.23 | 1.80 |
| Adult width (mm) | 57 | 3.18 | 6.10 | 4.57 | 0.61 |

Embodiment 6

An average tube diameter for trapping *Euodynerus nipanicus* is 6.97 mm. By observing and measuring a large sample size, the diameter of the artificial nesting tube chosen by the *Euodynerus nipanicus* for nesting ranges from 5 mm to 7 mm.

A determination standard for an effective nesting tube is as follows: (1) for *Euodynerus nipanicus* constructing the nest by using mud, only nest data with intact nest entrance without holes can be included in the statistics. When a reed tube has a node in the middle and there are bees of the same species nesting at both ends, the tube is recorded as two nesting tubes. If the tube is nested by different specifies of bees, it is also recorded as two nesting tubes.

Main parameter data of cell structure for *Euodynerus nipanicus*

| Parameter | Sample size | Minimum value | Maximum value | Mean | Standard deviation |
|---|---|---|---|---|---|
| Tube diameter (mm) | 108 | 4.89 | 11.25 | 6.97 | 1.53 |
| Cell length (mm) | 412 | 6.35 | 52.46 | 14.27 | 4.74 |
| Adult length (mm) | 59 | 5.70 | 13.91 | 9.54 | 1.70 |
| Adult width (mm) | 59 | 1.74 | 3.39 | 2.75 | 0.42 |

What is claimed is:

1. An application method of an artificial nest for solitary bees, comprising the following steps:
    S1: hanging, by a main enclosure tube (1), the artificial nest on a tall tree or a telephone pole by means of hanging rings (2), and meanwhile, providing an initial tension to fastening springs (42) in tightening mechanisms (4) to fasten and clamp trapping hollow tubes (3) into the tightening mechanisms (4), thereby preventing the trapping hollow tubes (3) from falling off the tree or pole due to the influence of external factors;
    S2: enabling an opening of the main enclosure tube (1) to face east, south or southeast and to be 1 to 2 m away from the ground;
    S3: checking the trapping hollow tubes (3), and sampling and dissecting so as to observe a nesting condition of bee species in the trapping hollow tubes (3); and
    S4: according to the nesting condition of bee species in the trapping hollow tube (3), selecting new trapping hollow tubes (3) with an appropriate size to replace the original trapping hollow tubes.

2. The application method of the artificial nest for solitary bees according to claim 1, wherein when each trapping hollow tube (3) is dissected in step S3, one end of the trapping hollow tube (3) is pressed against a brim of a white porcelain plate, and a sealed end of a cell faces an experimenter; an area of about one third of the circumference of the trapping hollow tube is gently split with a knife along a direction of the tube; as the knife is sharp, in order to reduce damage to the cell, only 5 cm of the tube is cut with the knife, and then the tube is gently broken off by hand along the cut section of the tube.

3. The application method of the artificial nest for solitary bees according to claim 1, wherein the step S4 of selecting new trapping hollow tubes (3) is conducted such that the new trapping hollow tubes (3) for trapping *Isodontia nigella* have a tube diameter of 9 mm to 10 mm; the new trapping hollow tubes (3) for trapping *Rhynchium quinquecinctum* have a tube diameter of 10 mm to 11 mm; and the new trapping hollow tubes (3) for trapping *Euodynerus nipanicus* and *Osmia excavata Alfken* have a tube diameter of 5 mm to 7 mm.

4. The application method of the artificial nest for solitary bees according to claim 1, wherein the step S3 of checking the trapping hollow tubes (3) is conducted monthly.

5. An application method of an artificial nest for solitary bees, comprising the following steps:
    providing the artificial nest, the nest comprising a main enclosure tube (1), hanging rings (2), a plurality of trapping hollow tubes (3), and tightening mechanisms (4) for clamping the trapping hollow tubes (3);
    S1: hanging, by the main enclosure tube (1), the artificial nest on a tall tree or a telephone pole by means of the hanging rings (2), and meanwhile, providing an initial tension to the tightening mechanisms (4) to fasten and clamp the trapping hollow tubes (3) into the tightening mechanisms (4), thereby preventing the trapping hollow tubes (3) from falling off the tree or pole due to the influence of external factors;
    S2: enabling an opening of the main enclosure tube (1) to face east, south or southeast and to be 1 to 2 m away from the ground; and
    S3: checking the trapping hollow tubes (3), and sampling and dissecting the trapping hollow tubes (3) so as to observe a nesting condition of bee species in the trapping hollow tubes (3).

6. The application method of the artificial nest for solitary bees according to claim 5, further comprising:
    S4: according to the nesting condition of bee species in the trapping hollow tube (3), selecting new trapping hollow tubes (3) with an appropriate size to replace the original trapping hollow tubes.

7. The application method of the artificial nest for solitary bees according to claim 6, wherein the step S4 of selecting new trapping hollow tubes (3) is conducted such that the new trapping hollow tubes (3) for trapping Isodontia nigella have a tube diameter of 9 mm to 10 mm; the new trapping hollow tubes (3) 1 for trapping Rhynchium quinquecinctum have a tube diameter of 10 mm to 11 mm; and the new trapping hollow tubes (3) for trapping Euodynerus nipanicus and Osmia excavata Alfken have a tube diameter of 5 mm to 7 mm.

8. The application method of the artificial nest for solitary bees according to claim 5, wherein when each trapping hollow tube (3) is dissected in step S3, one end of the trapping hollow tube (3) is pressed against a brim of a plate, and a sealed end of a cell faces an experimenter; an area of about one third of the circumference of the trapping hollow tube is gently split with a knife along a direction of the tube; as the knife is sharp, in order to reduce damage to the cell, only 5 cm of the tube is cut with the knife, and then the tube is broken off by hand along the cut section of the tube.

9. The application method of the artificial nest for solitary bees according to claim 5, wherein the step S3 of checking the trapping hollow tubes (3) is conducted monthly.

\* \* \* \* \*